United States Patent
Wei

(10) Patent No.: US 11,099,099 B1
(45) Date of Patent: *Aug. 24, 2021

(54) SYSTEM AND METHOD FOR SELECTING VIRTUAL APPLIANCES IN COMMUNICATIONS WITH VIRTUAL PRIVATE CLOUD NETWORKS

(71) Applicant: Aviatrix Systems, Inc., Palo Alto, CA (US)

(72) Inventor: Xiaobo Sherry Wei, Palo Alto, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,131

(22) Filed: Feb. 5, 2018

Related U.S. Application Data

(63) Continuation-in-part of application No. 15/818,604, filed on Nov. 20, 2017, now Pat. No. 10,148,616.

(Continued)

(51) Int. Cl.
| | | |
|---|---|---|
| *H04L 12/64* | (2006.01) | |
| *G01M 3/32* | (2006.01) | |
| *H04L 29/12* | (2006.01) | |

(52) U.S. Cl.
CPC ....... *G01M 3/3272* (2013.01); *H04L 61/6022* (2013.01); *H04L 2012/6448* (2013.01); *H04L 2012/6467* (2013.01)

(58) Field of Classification Search
CPC ....... G01M 3/34; G01M 3/3272; H04L 61/20; H04L 61/2015; H04L 21/2023;
(Continued)

(56) References Cited

U.S. PATENT DOCUMENTS

| | | | | |
|---|---|---|---|---|
| 10,523,466 B1* | 12/2019 | Sivaraj | ................ | H04L 12/4679 |
| 2013/0163473 A1* | 6/2013 | An | ...................... | H04L 41/0806 |
| | | | | 370/255 |
| 2014/0301391 A1* | 10/2014 | Krishnan | ............... | H04L 45/66 |
| | | | | 370/390 |

OTHER PUBLICATIONS

Author Unknown, VPN using the same address pool as network, pp. 1-3, May 26, 2014.*

(Continued)

*Primary Examiner* — Hardikkumar D Patel
(74) *Attorney, Agent, or Firm* — Rutan & Tucker, LLP

(57) ABSTRACT

A method for facilitating communications between client devices in geographically separated networks is described. First, message monitoring is conducted by each of a plurality of virtual appliances within a local network to detect a message of a first message type. Responsive to failing to locate a Media Access Control (MAC) address of a destination for the message within a prescribed table by a default gateway, one of the plurality of virtual appliances is selected for handling a forwarding of the message to a plurality of remote networks, and the message via the selected virtual appliance is forwarded to a plurality of gateways associated with a plurality of remote networks. Responsive to locating the MAC address of the destination within the table, the virtual appliance previously handling communications with the destination to forward the message to the destination.

30 Claims, 5 Drawing Sheets

Related U.S. Application Data which is a continuation of application No. 14/591,589, filed on Jan. 7, 2015, now Pat. No. 9,825,906.

(60) Provisional application No. 62/455,511, filed on Feb. 6, 2017.

(58) Field of Classification Search
CPC ............... H04L 61/203; H04L 61/2046; H04L 61/2061; H04L 61/2069; H04L 61/2076; H04L 29/12207; H04L 29/12264; H04L 29/12292; H04L 61/2596; H04L 61/103; H04L 61/6068; H04L 61/2007; H04L 61/6013; H04L 61/6022; H04L 2012/6448; H04L 2012/6467; H04L 63/0876
See application file for complete search history.

(56) References Cited

OTHER PUBLICATIONS

Author Unknown, PenVPN Configuring Protected Point2Pint for OpenVPN Access Server, Feb. 19, 2012, pp. 1-4.*
Author Unknown, How VPN Works, as captured by the Internet Archive, www.archive.org on Sep. 18, 2010, pp. 1-33.*
Author Unknown, Cisco ASR 901S Series Aggregation Services Router Software Configuration Guide, pp. 1-17, Nov. 21, 2013.*
D. Fucitalo, Marc Grote, VPN with pool of statics addr, Sep. 27, 2011.*

* cited by examiner

SYSTEM AND METHOD FOR SELECTING VIRTUAL APPLIANCES IN COMMUNICATIONS WITH VIRTUAL PRIVATE CLOUD NETWORKS

RELATED MATTERS

This application is a continuation-in-part of U.S. patent application Ser. No. 15/818,604, filed Nov. 20, 2017, which is a continuation of U.S. patent application Ser. No. 14/591,859, filed Jan. 7, 2015, now U.S. Pat. No. 9,825,906, which claims the benefit of the earlier filing dates of U.S. provisional application No. 61/925,221, filed Jan. 9, 2014; U.S. Provisional Application No. 61/937,529 filed Feb. 8, 2014; and U.S. Provisional Application No. 62/002,959 filed May 26, 2014; and this application claims the benefit of priority on U.S. Provisional Patent Application No. 62/455,511, filed Feb. 6, 2017, the entire contents of all of these applications are incorporated by reference herein.

FIELD OF THE DISCLOSURE

Embodiments of the present disclosure relate to a system and method that controls distribution of requests from client devices to private cloud networks that deploy multiple instances of virtual machines and reside within a public cloud.

BACKGROUND

Over the last decade, there has been a substantial increase in the use and deployment of network enabled client devices. These client devices may join a Layer 2 (L2) local network in which the client devices operate on the same subnet (i.e., address range). Since client devices operate using the same subnet, communications between client devices may be performed using media access control (MAC) addresses. In particular, network devices within this L2 local network may use Address Resolution Protocol (ARP) requests and responses to resolve a mapping between Internet Protocol (IP) addresses and MAC addresses for client devices. Based on this mapping, client devices may communicate with each other within the local network using MAC addresses.

In some situations, the local network described above may be communicatively coupled to one or more geographically remote networks such that client devices in the local network may communicate with a public cloud services to obtain access to particular resources, such as applications and/or storage. Examples of public clouds include Amazon® AWS, Google® Compute Engine and Microsoft® Azure Services Platform. In this configuration, the local network typically operates on a different subnet (i.e., address range) than the remote networks, producing a resultant Layer 3 (L3) network. As a L3 network, client devices in the local network communicate using intermediate routing devices instead of directly using MAC addresses as with a L2 network. Accordingly, the client devices on the local network and the remote networks are in different broadcast domains and may not efficiently transmit multicast or broadcast packets in this L3 network. However, as described in U.S. Pat. No. 9,825,906, a mechanism has been developed to manage, create and connect a local network to private cloud networks within a public cloud to collectively operate as a L2 network. However, this deployment may experience throughput performance limitations, given limited processing, memory and network bandwidth resources. A solution to solve the performance limitations is needed.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
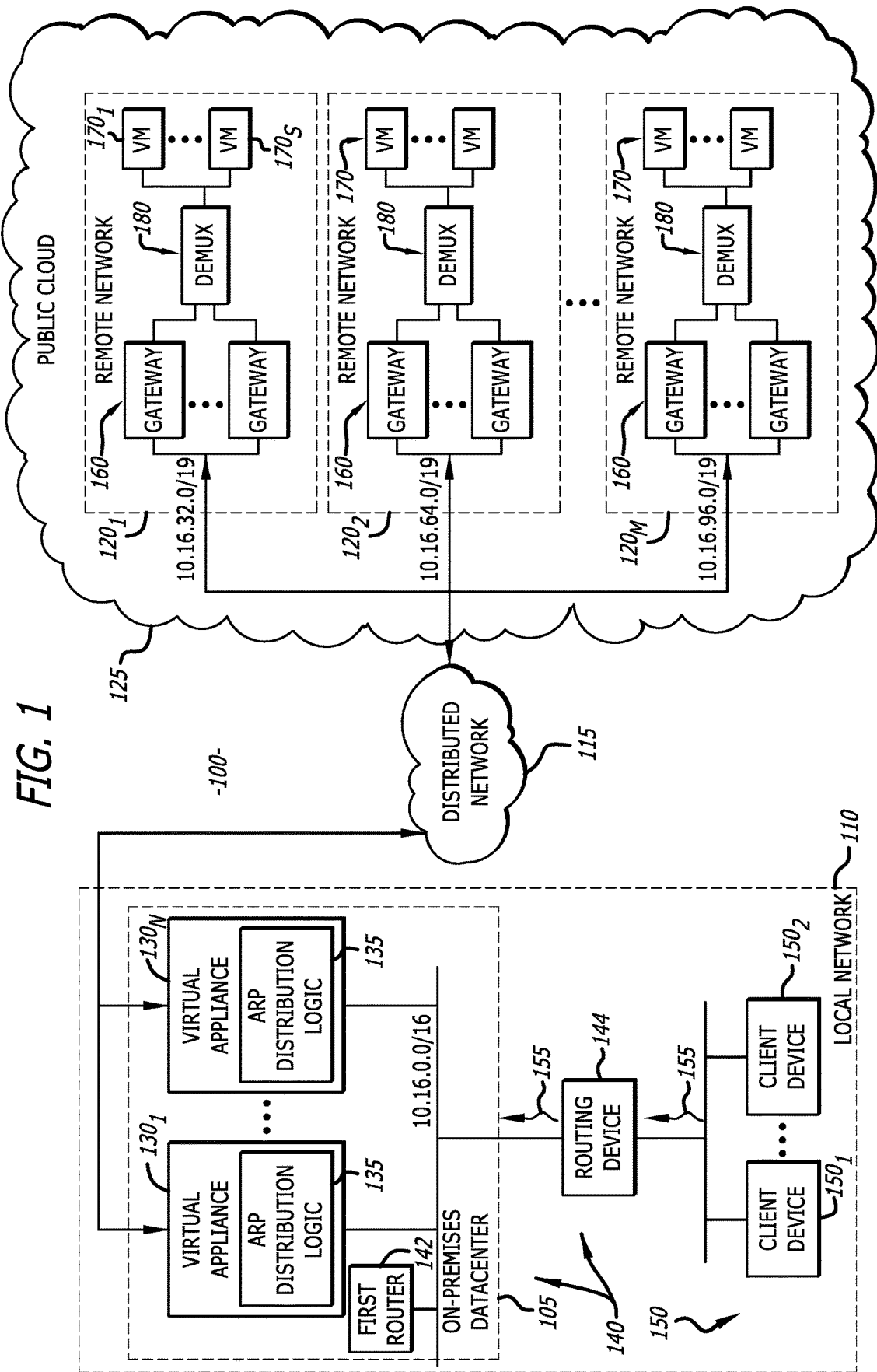
FIG. 1 illustrates an exemplary block diagram of a communication system 100 operating in accordance with a first embodiment of an on-premises datacenter deployed within a local network.

Various embodiments of the disclosure relate to a system and method for addressing performance limitations experienced by a datacenter extension, namely a mechanism that manages, creates and connects to public cloud networks. Herein, multiple (i.e., two or more) virtual appliances are deployed in an on-premises datacenter on a virtual local area network (VLAN) or subnet. The VLAN may be subdivided into smaller segments, and each segment becomes the network address (Classless Inter-Domain Routing "CIDR" block) for a virtual private cloud network being part of a public cloud network. From a virtual appliance, a private cloud network of the public cloud network is created with the segment as its CIDR block, a gateway is launched inside the segment, and a peer-to-peer communication path (e.g., secure tunnel) is created between the virtual appliance and the private cloud network. As a result, on-premises client devices conduct message exchanges with virtual machines instances and/or components (generally referred to as "VMs") deployed within the private cloud network to enable L2-based communications between these components.

More specifically, a virtual appliance behaves as an Open Systems Interconnection (OSI) L2 device, monitors incoming signaling to detect an ARP request, forwards to a request message (e.g., ARP request or a message including information associated with the ARP request) to a corresponding gateway deployed in one or more private cloud networks created through corresponding secure tunnels. A gateway in the private cloud network responds to the ARP request by including at least a MAC address associated with the responding VM (or responding gateway), as described below. Once the virtual appliance learns a MAC address for the responding VM (or gateway), one or more subsequent unicast packets can be forwarded in both directions to support L2 network communications between the virtual appliance and the gateway/responding VM.

As described below, multiple virtual appliances are deployed on the VLAN to form a cluster, where each virtual appliance of the cluster is configured to establish a secure tunnel (e.g., encrypted peer-to-peer communications) with a corresponding gateway in one or more private cloud networks. The multiple virtual appliances are used to address network performance limitations by increasing the packet throughput supported by the system. In order to avoid duplicative forwarding of ARP requests and receipt of ARP responses by multiple virtual appliances, each of the virtual appliances in the cluster operates in concert such that one virtual appliance handles an ARP request for a private IP address in the private cloud network that belongs to the responding VM. This virtual appliance selection may be accomplished through a plurality of ARP distribution schemes.

For instance, a first ARP distribution scheme may be implemented by deploying the same ARP distribution logic within each virtual appliance of the multiple virtual appliances within a cluster. According to one embodiment of the disclosure, the ARP distribution logic may be configured to conduct an analysis of information associated with an incoming ARP request, and the result of such analysis selects the particular virtual appliance to handle the ARP request. As an illustrative example, each of the virtual appliances may be assigned an index value (i.e., a unique identifier that can be differentiated from other identifiers). Herein, the ARP distribution logic may perform a modulo operation on a portion of a destination IP address for the ARP request, and the resulting remainder identifies the virtual appliance (e.g., remainder matches an assigned index value for the virtual appliance).

As another illustrative example, the ARP distribution logic may perform an analysis of a derived value associated with an address (e.g., destination address, source address, MAC address, etc.) within the ARP request. The "derived value" may be a representative value of the address to identify the selected virtual appliance such as (i) a hash value produced by performing a one-way hash on the address or (ii) a portion of the hash value (e.g., portion of the hash value matches the assigned index value for the virtual appliance).

Based on the result of the above-described analyses, each virtual appliance decides if it should drop the ARP packet or forward the ARP packet, thereby leaving a unique virtual appliance for handling the ARP request. However, it is contemplated that selection of the virtual appliance may be accomplished without analysis of the ARP request information, such as a round-robin selection process.

A second ARP distribution scheme may be implemented by deploying multiple virtual appliances, where each virtual appliance is configured to forward an incoming ARP request (or information from the ARP request) along with an identifier of the virtual appliance to a controller. The controller is implemented with the above-described ARP distribution logic that determines which specific virtual appliance of the plurality of virtual appliances handle the ARP request based on the ARP distribution mechanisms described above. Herein, the ARP distribution logic may consider other factors besides the destination IP address (e.g., load measured by processor utilization, queue storage, or traffic load measured at interface logic for each virtual appliance, software profiles supported by each virtual appliance, etc.). Once the MAC address is learned of the responding gateway, subsequent packet communications for this session (Transmission Control Protocol "TCP" or User Datagram Protocol "UDP") may be carried out by the virtual appliance without assistance by the controller.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

I. Terminology

Herein, certain terminology is used to describe features for embodiments of the disclosure. For example, each of the terms "logic" and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more of the following: process, instance, Application Programming Interface (API), subroutine, function, script, applet, servlet, routine, source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "digital device" generally refers to any electronic device that includes processing circuitry running at least one process adapted to control communications via a network. Examples of digital devices include a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a routing device (e.g., router, switch, brouter, controller, etc.) or a client device (e.g., a television, a content receiver, a set-top box, a computer, a tablet, a laptop, a desktop, a netbook, a video gaming console, a television peripheral, a printer, a mobile handset, a smartphone, a personal digital assistant "PDA," a wireless receiver and/or transmitter, an access point, or a base station).

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium described above.

The term "transmission medium" may be construed as a physical or logical communication path between two or more digital devices or between components within a digital device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between the two digital devices or components, independent of the physical medium used.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. On Premises Datacenter Architecture

A. ARP Distribution Logic within the Virtual Appliances

Referring to FIG. 1, an exemplary block diagram of a communication system 100 operating in accordance with a first embodiment of an on-premises datacenter 105 deployed within a local network 110 is shown. According to this embodiment of the disclosure, the communication system 100 features the local network 110, which may be communicatively coupled to one or more of remote networks $120_1$-$120_M$ (M≥1), such as private cloud networks within a public cloud 125, via the on-premises datacenter 105. Such communications from the on-premises datacenter 105 of the local network 110 to the remote networks $120_1$-$120_M$ are supported by one or more routing devices interconnected by transmission medium (e.g., distributed network 115). Although shown as including three remote networks $120_1$-$120_M$, in other embodiments, the system 100 may include any number of remote networks.

The local network 110 features the on-premises datacenter 105 including a plurality of virtual appliances $130_1$-$130_N$ (N>1), one or more routing devices 140, and one or more client devices 150 (e.g., client devices $150_1$ and $150_2$). Similarly, each remote network $120_1$-$120_M$ may include one or more gateways 160 and one or more virtual machines (VMs) 170, which are communicatively coupled together via demultiplexer logic 180. For instance, the first remote network $120_1$ features one or more gateways $160_1$-$160_R$ (R≥1), each communicatively coupled to one or more virtual machines (VMs) $170_1$-$170_S$ (S≥1) via demultiplexer logic 180 as described in U.S. patent Ser. No. 15/280,890 filed Sep. 29, 2016, the contents of which are incorporated by reference herein. As shown, a subnet address range associated with the local network 110 may be subdivided into multiple sub-segment address ranges. Each remote network $120_1$-$120_M$ may be assigned one of the sub-segment address ranges for communicating with the local network 110. Each sub-segment address range is a smaller part of the original subnet address range of the local network 110 and each sub-segment address range does not overlap with any other sub-segment address range assigned to other remote networks $120_1$-$120_M$.

Using the virtual appliances $130_1$-$130_N$ and the gateways $160_1$-$160_R$, the client devices $150_1$-$150_2$ in the local network 110 and the VMs $170_1$-$170_S$ in the remote networks $120_1$-$120_M$ may seamlessly communicate with each other using their native private Internet Protocol (IP) addresses as destination addresses and without indirect address mapping. Further, the virtual appliances $130_1$-$130_N$ and the gateways $160_1$-$160_R$ allow client devices $150_1$-$150_2$ in the local network 110 and the VMs $170_1$-$170_S$ in the remote networks $120_1$-$120_M$ to communicate without use/installation of a corresponding software agent or knowledge of their location in separate physical networks (e.g., the local network 110 and the remote networks $120_1$-$120_M$). Each component of the local network 110 and the remote networks $120_1$-$120_M$ will now be described by way of example. In other embodiments, the local network 110 and the remote networks $120_1$-$120_M$ may include more or less components than those shown and described herein.

Figure 2:
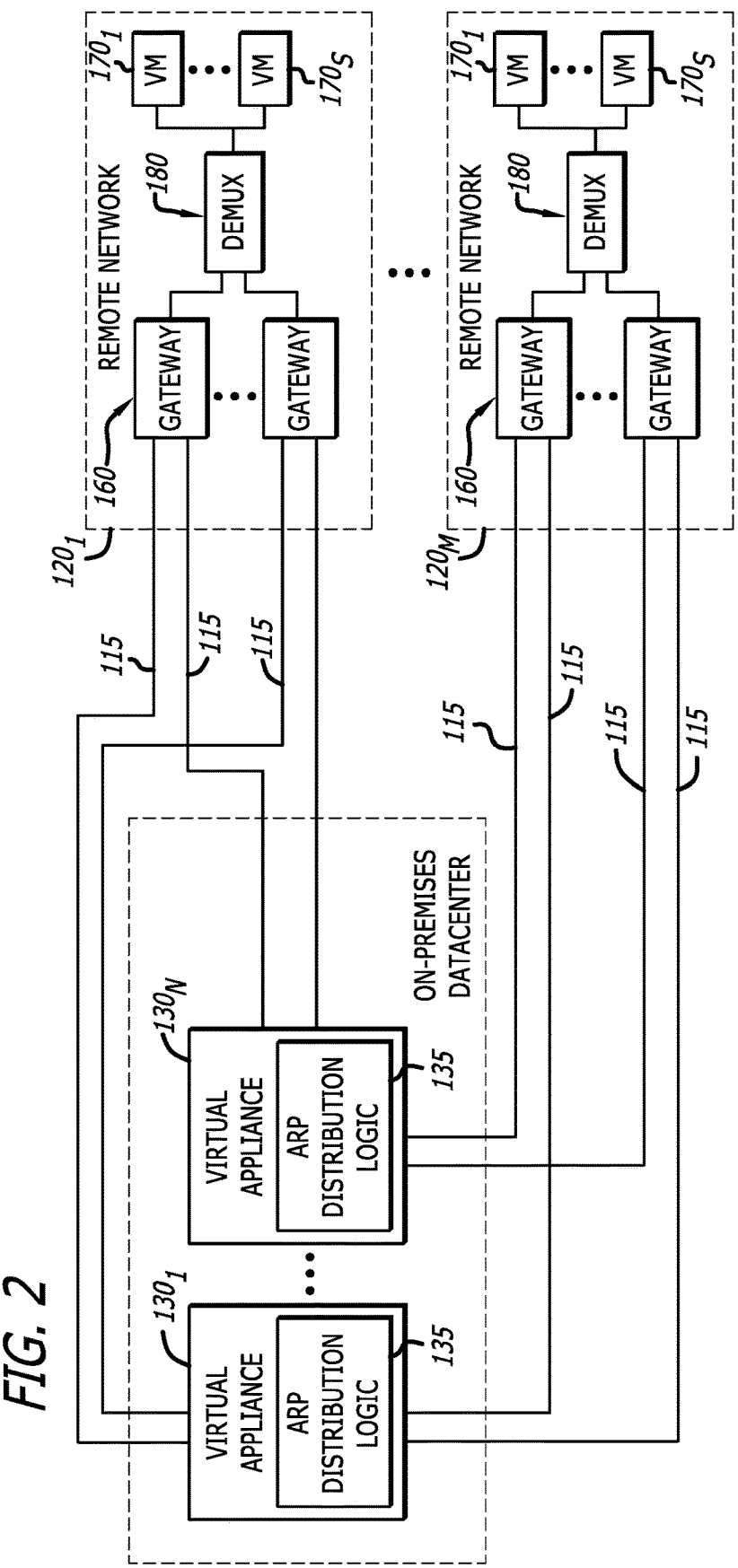
FIG. 2 illustrates an exemplary logical representation of the communication system of FIG. 1.

As illustrated by a logical representation of the communication system 100 in FIG. 2, the virtual appliances $130_1$-$130_N$ within the on-premises datacenter 105 coordinate all traffic destined to and received from the remote networks $120_1$-$120_M$, including the creation of one or more tunnels 115, at least in part, by the remote networks $120_1$-$120_M$ and encryption/decryption for these tunnels. In this fashion, the virtual appliances $130_1$-$130_N$ function as a L2 bridge for communicating with the VMs $170_1$-$170_S$ in the remote networks $120_1$-$120_M$.

According to this embodiment of the disclosure, as shown in FIGS. 1-2, selection of a particular virtual appliance $130_1$, . . . , or $130_N$ is accomplished by deploying ARP distribution logic 135 within each of the virtual appliances $130_1$-$130_N$. As a result, upon issuance of an ARP request 155 from one of the client devices 150 (e.g., client device $150_1$), each of the virtual appliances $130_1$-$130_N$ detects the ARP request 155. In order to avoid duplicative forwarding of the ARP request 155 from the virtual appliances $130_1$-$130_N$ and receipt of ARP responses, deployed as a component for each virtual appliances $130_1$-$130_N$, the ARP distribution logic 135 conducts an analysis of information associated with the ARP request 155. As the same analysis is conducted by each of the plurality of virtual appliances $130_1$-$130_N$, the result of the analysis may be used by the ARP distribution logic 135 to uniquely select a particular virtual appliance $130_1$, . . . , or $130_N$ to handle the ARP request 155.

Figure 3:
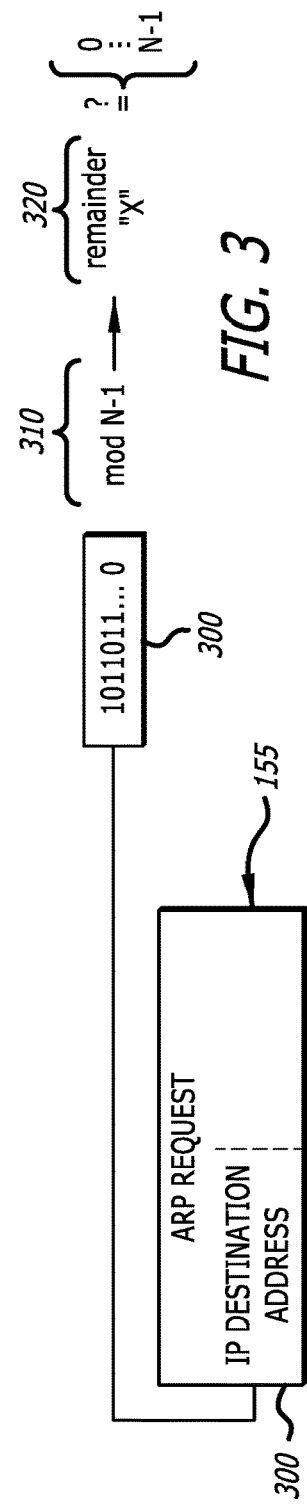
FIG. 3 illustrates exemplary operations of the ARP distribution logic of a virtual appliance or controller to uniquely select a particular virtual appliance to handle an incoming ARP request.

As an illustrative example, as shown in FIG. 3, each of the particular virtual appliance $130_1$, . . . , or $130_N$ may be assigned an index value from "0" to "N−1". For this embodiment, the ARP distribution logic 135 implemented within each virtual appliance $130_1$-$130_N$ is configured to perform a modulo operation 310 on a selected address 300 within the ARP request 155 (e.g., a destination IP address for the ARP request 155). After the modulo operation 310, a remainder 320 ranging from "0" to "N−1" constitutes a result of the analysis. Thereafter, the ARP distribution logic 135 implemented within each virtual appliance $130_1$-$130_N$ compares the result (remainder) to the assigned index value of its virtual appliance $130_1$, . . . , or $130_N$. Where a match is detected by a particular ARP distribution logic 135 implemented in one of the virtual appliances (e.g., remainder "0" indicates to the ARP distribution logic 135 that the virtual appliance $130_1$ with index value "0" is to handle the ARP request 155), the virtual appliance $130_1$ handles communications between the local network 110 and the public cloud network 125.

As another illustrative example, although not shown, the ARP distribution logic 135 implemented within each virtual appliance $130_1$-$130_N$ may perform an analysis of a derived value associated with an address (e.g., destination address, source address, MAC address, etc.) within the ARP request 155. This derived value may be a hash value produced by a one-way hash and a portion of the hash value identifies a selected virtual appliance (e.g., the portion of the hash value matches the assigned index value for the virtual appliance). Based on the result of these analyses, each virtual appliance $130_1$-$130_N$ decides whether the ARP packet 155 is dropped or forwarded to corresponding gateways $160_1$-$160_R$, thereby leaving a unique virtual appliance (e.g., one of the virtual appliances $130_1$-$130_N$) for handling the ARP request 155. It is contemplated, however, that selection of the virtual appliance may be accomplished without analysis of the ARP request information, such as a round-robin selection process.

Figure 4:
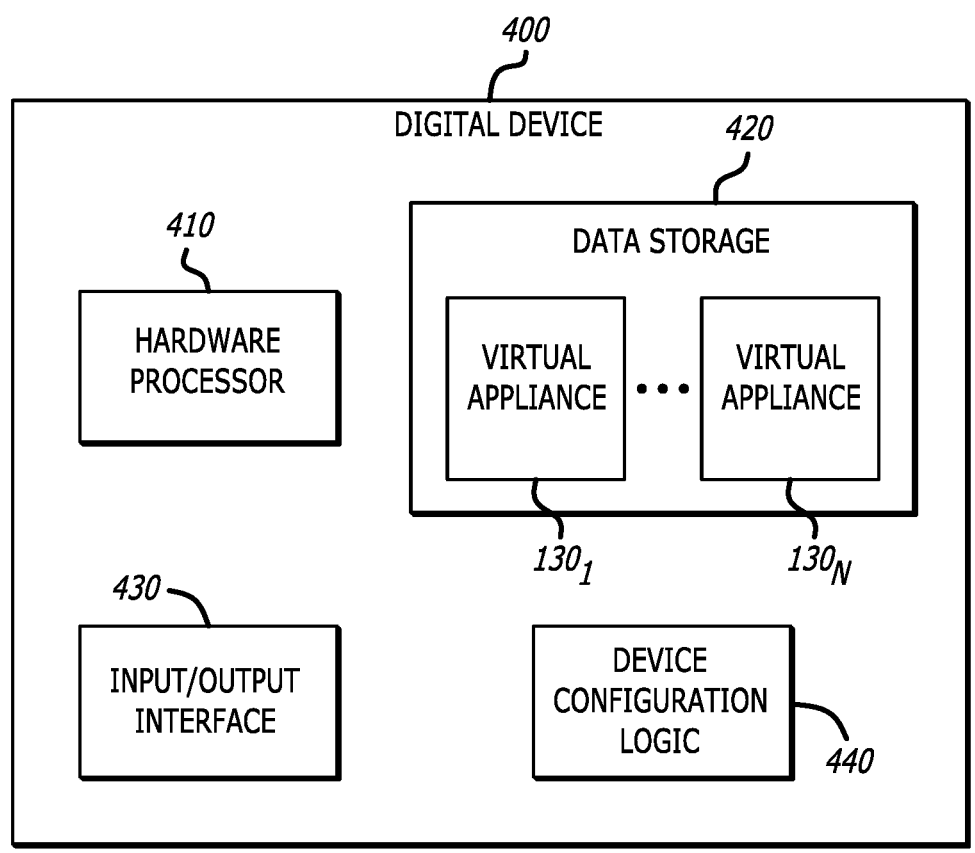
FIG. 4 illustrates an exemplary embodiment of a component diagram of the digital device in which a virtual appliance operates.

In some embodiments, each of the virtual appliances $130_1$-$130_N$ may be implemented as a physical and/or virtual component operating within a digital device. For example, as shown in FIG. 4, an exemplary embodiment of a component diagram of the digital device 400 in which a virtual appliance (e.g., virtual appliances $130_1$) operates is illustrated. Herein, the digital device 400 comprises one or more of: a hardware processor 410, data storage 420, an input/output (I/O) interface 430, and device configuration logic 440. The digital device 400 may be any network computing device, including a laptop computer, a desktop computer, a server, etc. Each of these components of the digital device 400 will be described in further detail below.

In one embodiment, the data storage 420 is a distributed set of data storage components. The data storage 420 of the digital device 400 may include a fast read-write memory for storing programs and data during operations, and a hierarchy of persistent memory, such as Read Only Memory (ROM), Erasable Programmable Read Only Memory (EPROM) and/or Flash memory for example, for storing instructions and data needed for the startup and/or operation of the digital device 400. For example, as shown in FIG. 4, the data storage 420 may include the virtual appliances $130_1$-$130_N$, which may be executed by the hardware processor 410. As noted above, the virtual appliances $130_1$-$130_N$ may be implemented as one or more virtual devices running in a hypervisor environment. In this embodiment, the data storage 420 may include the necessary components for virtualization, including hypervisor software components.

In one embodiment, the I/O interface 430 corresponds to one or more components used for communicating with other devices (e.g., the gateways $160_1$-$160_3$ and/or the routing device(s) 140 of FIG. 1) via wired or wireless signals. The I/O interface 430 may include a wired network interface such as an IEEE 802.3 Ethernet interface and/or a wireless interface such as an IEEE 802.11 WiFi interface. Hence, the I/O interface 430 may facilitate communications with gateways $160_1$-$160_R$, the routing device(s) 140, or other devices in the system 100 over corresponding wired or wireless connections.

In one embodiment, the hardware processor 410 is coupled to the data storage 420 and the I/O interface 430. The hardware processor 410 may be any processing device including, but not limited to a MI PS/ARM-class processor, an Intel®-class processor (e.g., X86, Pentium, etc.), a microprocessor, a digital signal processor, an application specific integrated circuit, a microcontroller, a state machine, or any type of programmable logic array.

In one embodiment, the device configuration logic 440 includes one or more functional units implemented using firmware, hardware, software, or a combination thereof. In some embodiments, the configuration logic 440 may be used for configuring parameters associated with one or more of the virtual appliance $130_1$-$130_N$ and/or creating and configuring the gateways $160_1$-$160_R$. For example, the device configuration logic 440 may be used for bridging/routing communications between client devices $150_1$ and $150_2$ in the local network 110 and VMs $170_1$-$170_S$ in the remote networks $120_1$-$120_M$, as shown in FIG. 1.

Similar to the virtual appliance $130_1$-$130_N$, the gateways $160_1$-$160_R$ handle all traffic destined to and received from the local network 110. In particular, each gateway $160_1$-$160_R$ handles separate network traffic between a corresponding remote network $120_1$-$120_M$ and the local network 110, including encryption/decryption for tunnels between a virtual appliance (e.g., virtual appliance $130_1$) and the gateways $160_1$-$160_R$. Each of the gateways $160_1$-$160_R$ may be assigned a separate sub-segment address range based on the address range of the local network 110 as described. In some embodiments, each of the remote networks $120_1$-$120_M$ represent cloud computing environments on a network device that is geographically separated from the local network 110. For example, each of the gateways $160_1$-$160_R$ may be implemented by one or more physical and/or virtual devices.

The virtual appliance $130_1$ may communicate with the gateways $160_1$-$160_R$ over the distributed network 125 as shown in FIG. 1. The distributed network 125 may include any number of networking devices, such as routers, switches, etc. In one embodiment, the distributed network 125 is the Internet.

The routing device(s) 140 may be one or more routing devices that route data between components within the system 100. For instance, the routing device(s) 140 may include a first router 142 operating as a default gateway and a second router 144 that supports the exchange of packets between virtual appliance $130_1$-$130_N$ and the client devices $150_1$ and $150_2$ as described in FIG. 4 below. According to one embodiment of the disclosure, the routing device 140 may comprise hardware processor, data storage, one or more I/O interface, and device configuration logic as described above in relation to the digital device 200 representative of the virtual appliance $130_1$.

In one embodiment, the VMs $170_1$-$170_S$ may be a logical representation of any wired or wireless electronic device capable of receiving and transmitting data over wired or wireless mediums. For example, the VMs $170_1$-$170_S$ are digital devices that include a hardware processor, memory hierarchy, and input/output (I/O) interfaces including a wired and/or wireless interface such as an IEEE 802.11 interface. More specifically, each of the VMs $170_1$-$170_S$ may be representative of a personal computer, a laptop computer, a netbook computer, a wireless music player, a portable communication device, a smart phone, a tablet computer, or a digital television.

B. ARP Distribution Logic within the Controller

Figure 5:
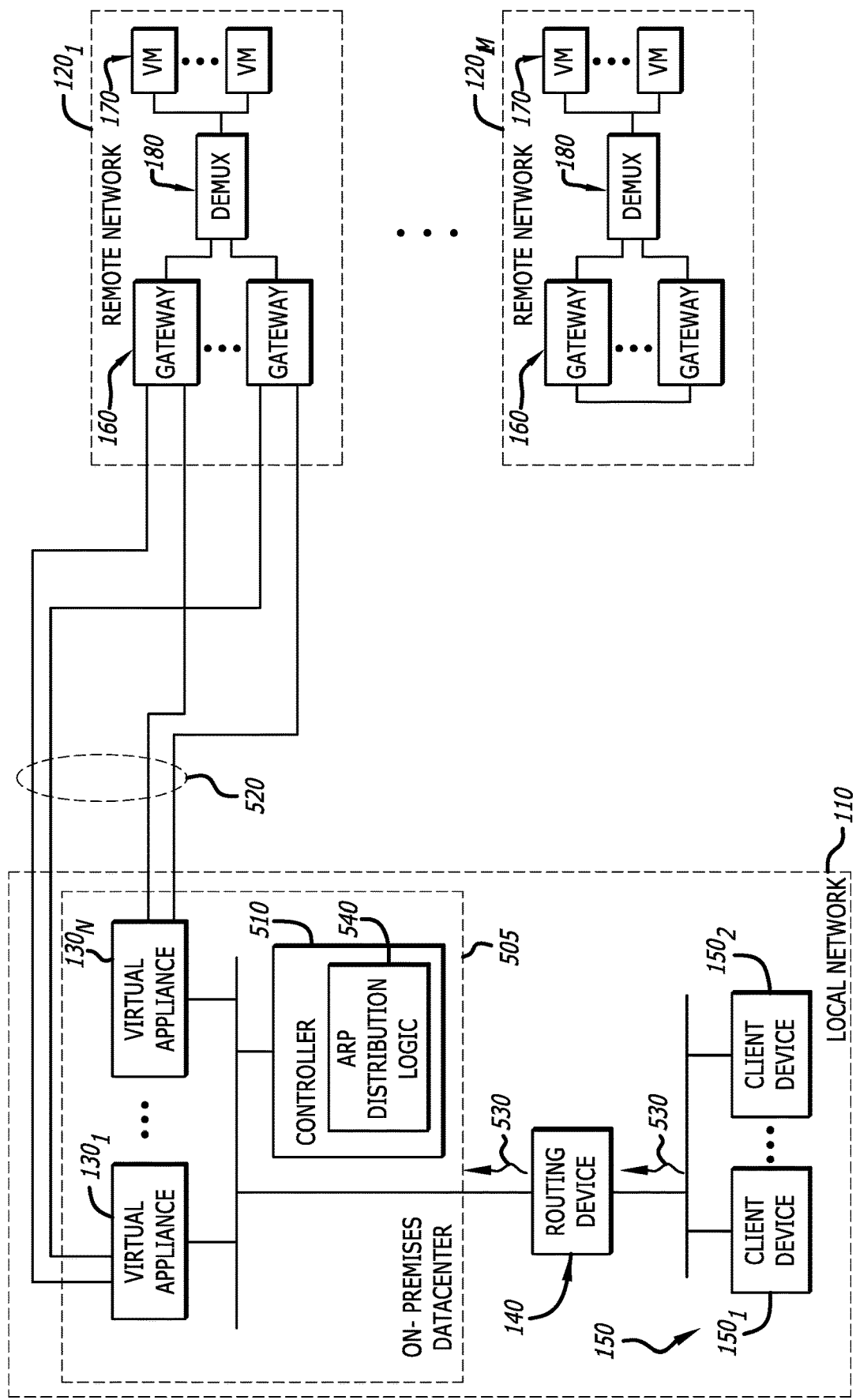
FIG. 5 illustrates an exemplary block diagram of a logical representation of a communication system operating in accordance with a second embodiment of an on-premises datacenter deployed within the local network.

Referring to FIG. 5, an exemplary block diagram of a logical representation of a communication system 500 operating in accordance with a second embodiment of an on-premises datacenter 505 deployed within the local network 110 is shown. According to this embodiment of the disclosure, the local network 110 features the on-premises datacenter 505 including the plurality of virtual appliances $130_1$-$130_N$ in communication with a centralized controller 510, one or more routing devices 140, and the client devices 150 (e.g., client devices $150_1$ and $150_2$).

As previously described for FIG. 1, the virtual appliances $130_1$-$130_N$ within the on-premises datacenter 105 handle all traffic exchanged between the local network 110 and the remote networks $120_1$-$120_M$ within the public cloud network 125, including the creation of one or more tunnels 520 (e.g., encrypted tunnels using IPSEC) with the remote networks $120_1$-$120_M$. Herein, only tunnels 520 associated with remote network $120_1$ are shown. As a result, the virtual appliances $130_1$-$130_N$ function as a Layer 2 (L2) bridge for communicating with the VMs $170_1$-$170_S$ in the remote networks $120_1$-$120_M$. According to this embodiment of the disclosure, selection of a particular virtual appliance $130_1$, . . . , or $130_N$ to handle an incoming ARP request 530 from a client device 140 is performed by ARP distribution logic 540 implemented within the controller 510.

More specifically, each of the virtual appliances $130_1$-$130_N$ is configured to detects an ARP request 530 from one of the client devices 150 (e.g., client device $150_1$). In order to avoid duplicative handling of the ARP request 530 by the virtual appliances $130_1$-$130_N$ for this embodiment, each of the virtual appliances $130_1$-$130_N$ routes a version of the detected ARP request 540 along with its identifier (e.g., assigned index number) to the controller 510. The controller 510 includes ARP distribution logic 540, which may conduct an analysis of information associated with the ARP request 530, such as the IP destination address or IP source address within the ARP request 530, as described above. This analysis may be directed to a portion of the information associated with the ARP request 530 or may be directed to a representation of this information (e.g., result of a modulo operation, particular sequence of bits within a hash value produced by performing a hash operation on the information associated with the ARP request 530, etc.).

Based on the result of this analysis, the controller 510 selects a particular virtual appliance $130_1$ . . . or $130_N$ (e.g., virtual appliance $130_N$) to handle the ARP packet 530. Thereafter, the controller 510 may notify the selected virtual appliance $130_N$ to handle communications associated with the incoming ARP packet 530 to corresponding gateways $160_1$-$160_R$ and/or notify the other virtual appliances $130_1$-$130_{N-1}$ to ignore the ARP request 530, thereby leaving a single virtual appliance (e.g., virtual appliance $130_N$) for handling the ARP request 530.

The controller 510 may be implemented as a physical and/or virtual component. For example, the controller 510 may be a digital device, including a hardware processor, data storage, I/O interface, and device configuration logic that allows for a change to the ARP distribution logic 540 implemented therein. Alternatively, the controller 510 may be software implemented within a digital device, where the controller 510 operates in accordance with the ARP distribution logic 540 described above.

III. Transmissions Between Local and Remote Networks

Figure 6:
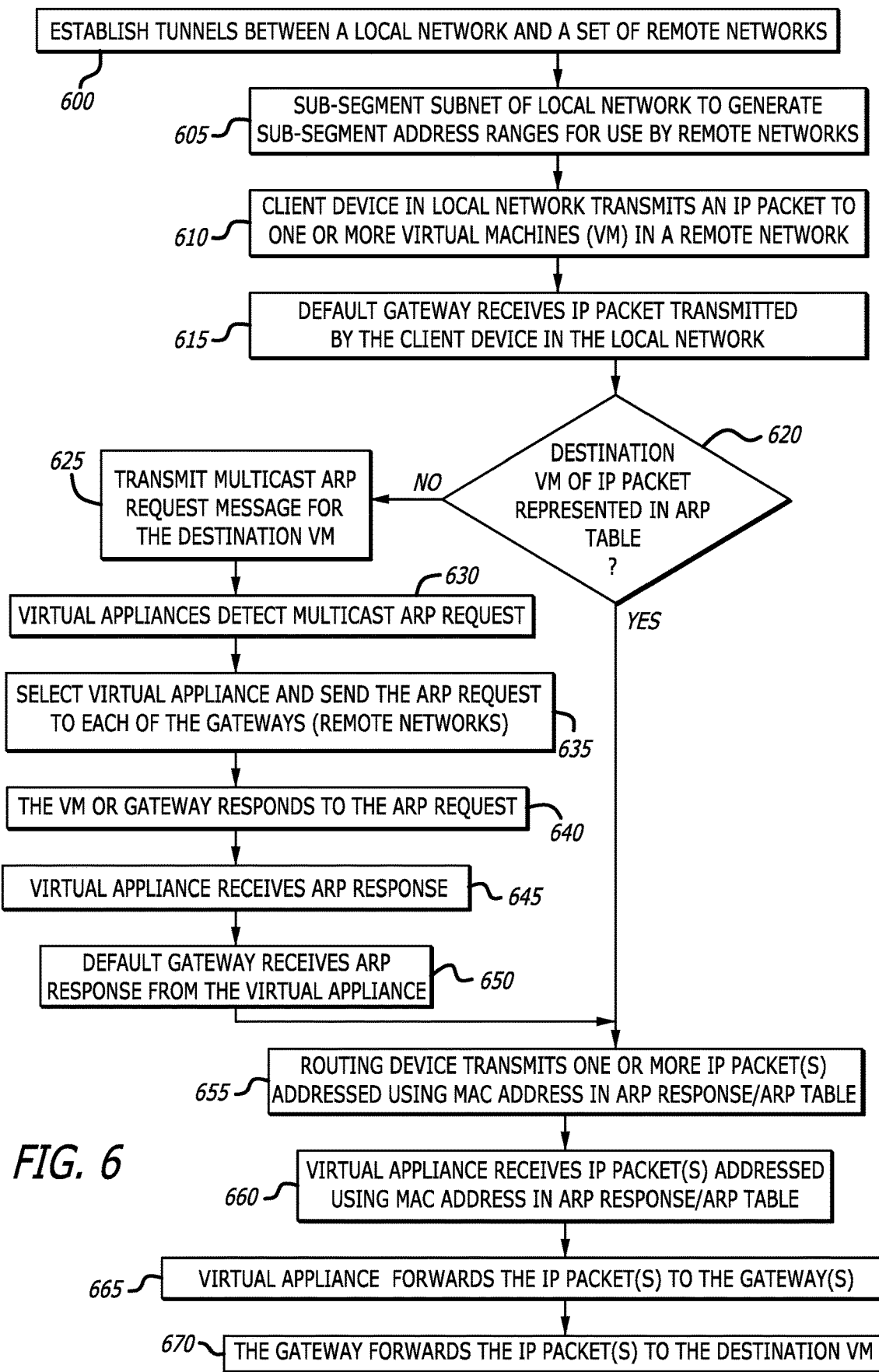
FIG. 6 illustrates a method for exchanging data from the local network to one or more of the remote networks of FIGS. 1-5.

Referring now to FIG. 6, a method for exchanging data from the local network 110 to one or more of the remote networks $120_1$-$120_M$ of FIGS. 1-5 is described below. Although this method will be described in relation to the illustrative communication system discussed above and shown in FIGS. 1-5, the method may be similarly performed for other communication system types and configurations.

Herein, multiple virtual appliances support seamless communications between the client devices in the local network and the virtual machines in the remote networks. In particular, the method allows a client device in the local network to transmit packets to a virtual machine in the remote networks via a selected virtual appliance of a cluster of virtual appliances and a corresponding gateway using native IP addresses without indirect address mapping.

Although the operations of the method are shown and described in a particular order, in other embodiments the operations of the method may be performed in a different order. For example, in some embodiments, two or more operations of the method may be performed concurrently (i.e., at least partially overlapping in time).

According to one embodiment of the disclosure, each of the virtual appliances establish secure tunnels with each individual gateway in the remote networks (operation 600). For instance, each virtual appliance $130_1$-$130_N$ may establish six tunnels with the gateway in the communication system of FIG. 1 and FIG. 5. Each of these bridged and routed tunnels may be secure tunnels with transit packets encrypted. Further, each of these tunnels allows the communication of data between the client devices within the same subnet address range using Ethernet/MAC addressing while routing tunnels allow communication of data between client devices 150 within different subnet address ranges using IP addresses.

Thereafter, a subnet address range of the local network 110 may be segmented into multiple sub-segments (operation 605). As used herein, segmenting or sub-segmenting the subnet address range of the local network is defined as splitting or otherwise dividing the available addresses assigned to the local network into two or more sub-segment address ranges (i.e., multiple smaller subnets). These sub-segments may thereafter be assigned to the remote networks. The methods and techniques used to segment the subnet address range of the local network may vary, provided the sub-segment address ranges do not overlap and are each within the subnet address range of the local network. For instance, sub-segmentation in relation to the subnet address range 10.16.0.0/16 may be segmented into 10.16.0.0/19, 10.16.32.0/19, 10.16.64.0/19, and 10.16.96.0/19 sub-segment address ranges, as shown in FIG. 1. The sub-segment address range 10.16.0.0/19 may corresponds to the default gateway of the local network while address ranges 10.16.32.0/19, 10.16.64.0/19, and 10.16.96.0/19 correspond to the remote networks $120_1$-$120_3$ (M=3) of FIG. 1, respectively. Although shown as being equal in size, in some embodiments the sub-segment address ranges may be of different sizes. For example, some sub-segment address ranges may have a mask length of 19 bits while others may have a sub-segment length of 18 or 20 bits. Accordingly, the sub-segment address ranges generated may vary in size.

Where a client device intends to access services (e.g., virtual machine) within the public cloud network, the client device sends the IP packet to the default gateway (e.g., the routing device 142 of FIG. 1). Through various intermediate network devices (e.g., routing device 144 of FIG. 1), the IP packet may arrive at the default gateway for the local network 110 (operations 610 and 615). As noted above, the first routing device (default gateway) manages the subnet 10.16.0.0/16. Since a VM within a first remote network (e.g. VM $170_1$) may be viewed by the first routing device (and first virtual appliance) as being in the 10.16.0.0/16 subnet (i.e., the subnet 10.16.32.0/19 of the remote network is within the 10.16.0.0/16 subnet managed by the routing device), a bridging tunnel may be established for transferring content associated with an incoming ARP packet. Accordingly, upon receipt of the IP packet, the routing device 142 (i.e., the default gateway) may determine whether an entry exists for the selected services in a forwarding table of the first routing device 142 (operation 620). The entry would include the Ethernet/MAC address of the targeted virtual machine (e.g., virtual machine 170$_1$ of FIG. 1).

Upon determining that virtual machine 170$_1$ is not represented in the forwarding table, a particular virtual appliance from a cluster of (multiple) virtual appliances is selected to transmit a multicast, ARP request (operations 625, 630 and 635). In this embodiment, each virtual appliance of the cluster of virtual appliances may operate in promiscuous mode such that all packets are accepted by each of these virtual appliances. Since each of the virtual appliances operates in promiscuous mode, the ARP request generated by the routing device is detected. Upon detecting the ARP request, a determination is made as to which virtual appliance of the cluster of virtual appliances is selected to forward the ARP request to each of the gateways via the secure tunnels. The selection of the virtual machine may be conducted by ARP distribution logic deployed in each of the virtual appliances as described above and illustrated in FIGS. 1-3 or may be conducted by a controller including the ARP distribution logic as described above and illustrated in FIG. 5.

Since the gateway is the default router for 10.16.32.0/19, upon which the virtual machine with the desired services is located, the gateway forwards the ARP request to the virtual machine. In contrast, the other gateways drop the ARP request since the virtual machine is not located within their respective subnets. Upon receipt of the ARP request, the virtual machine may respond to the ARP request (operation 640). The ARP response may include various pieces of data, including the Ethernet/MAC address associated with the virtual machine 170$_1$, which was requested by selected virtual appliance.

In some embodiments, instead of forwarding the ARP request to the virtual machine, the gateway may respond on behalf of the virtual machine (operation 645). In these embodiments, the ARP response may include the Ethernet/MAC address of the gateway (e.g., gateway 160$_1$ of FIG. 1) instead of the virtual machine (e.g., VM 170$_1$ of FIG. 1). By responding on behalf of the virtual machine, the gateway may ensure that the multicast ARP request is not dropped. In another embodiment, the gateway may change the source MAC address in the ARP request and then forward the ARP request to the virtual machine. When ARP response comes back from the virtual machine, the destination MAC address in the ARP response may be replaced with the original source MAC address.

The ARP response packet, which originated from either the virtual machine or the gateway, may be received by the selected virtual appliance over an established routing tunnel (operation 645). Since the selected virtual appliance functions as a bridge and the ARP response was routed, the selected virtual appliance will release the ARP response on the wire/connection between the selected virtual appliance and the first routing device such that the ARP response may be received by the virtual appliance, which manages the subnet of the local network (operation 650).

Based on the received ARP response, the first routing device has the Ethernet/MAC address of what the first routing device believes to be the virtual machine and may add an ARP table entry for the virtual machine based on this Ethernet/MAC address (operation 655). However, as noted above, this Ethernet/MAC address may belong to either the virtual machine or through a proxy response the Ethernet/MAC address may belong to the gateway.

Either after receiving the ARP response or after determining that the virtual machine is represented in the ARP table of the routing device, the selected virtual appliance transmits the IP packet (and subsequent IP packets during a communication session) from the client device directed to the virtual machine using the presumed MAC address of the virtual machine until termination of the communication session (operation 660). Such transmissions are unicast on the bridge tunnel established between the selected virtual appliance and the gateway using the Ethernet/MAC address received by the first routing device. The selected virtual appliance may determine the correct bridge tunnel to use for transmission to the gateway based on a tunnel on which the prior ARP response from the gateway was received (operation 665). Upon receipt of the IP packet, the virtual appliance (via the first router) may transmit the IP packet to the destination VM (operation 670).

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for facilitating communications between client devices in geographically separated networks, comprising:
   detecting a message of a first message type by a routing device operating as a default gateway within a local network further including a plurality of virtual appliances;
   responsive to failing to locate a Media Access Control (MAC) address of a destination for the message within a table by the default gateway, selecting one of the plurality of virtual appliances for handling a forwarding of a request message to a plurality of remote networks, and forwarding the request message via the selected virtual appliance to a plurality of gateways associated with a plurality of remote networks to receive the MAC address of the destination; and
   responsive to locating the MAC address of the destination within the table, selecting a virtual appliance of the plurality of virtual appliances previously handling communications with the destination to forward the message to the destination.

2. The method of claim 1, wherein the message of the first message type is an Address Resolution Protocol (ARP) request message.

3. The method of claim 1, further comprising:
   segmenting a subnet address range assigned to the local network to each of the plurality of remote networks communicatively coupled to the local network.

4. The method of claim 2, wherein the selecting of the one of the plurality of virtual appliances for handling the forwarding of the request message to the plurality of remote networks includes performing a modulo operation on an address within the ARP request message to produce a result operating as an index value for identifying the one of the plurality of virtual appliances.

5. The method of claim 2, wherein the destination corresponds to a virtual machine within a private cloud network.

6. The method of claim 1, wherein prior to detecting the message of the first message type, the method further comprising:
establishing tunnels between the plurality of virtual appliances and each of the plurality of gateways of the plurality of remote networks.

7. The method of claim 5 further comprising:
receiving an ARP response message by the selected virtual appliance from a first gateway of the plurality of gateways, wherein the first gateway is associated with the virtual machine; and
forwarding the message including an Internet Protocol (IP) packet to the destination using the selected virtual appliance based on the MAC address provided in the ARP response message.

8. The method of claim 1, wherein subsequent to forwarding the request message, the method further comprising:
receiving, by the selected virtual appliance, a response message from one of the plurality of gateways.

9. The method of claim 8, wherein the request message is an Address Resolution Protocol (ARP) request message and the response message is an ARP response message.

10. The method of claim 9, wherein the request message is a multicast ARP request message generated by the routing device.

11. The method of claim 8, wherein the response message includes an address associated with a virtual machine within a first remote network of the plurality of remote networks included as part of a public cloud network, the first remote network including the first gateway.

12. The method of claim 11, wherein the address included in the response message comprises the MAC address of the destination corresponding to a MAC address belonging to the virtual machine.

13. The method of claim 11, wherein the address included in the response message comprises the MAC address of the destination corresponding to a MAC address belonging to a first gateway of the plurality of gateways.

14. The method of claim 8, wherein the selecting of the one of the plurality of virtual appliances for handling the forwarding of the request message to the plurality of remote networks includes performing a hash operation on an address within the request message, being an Address Resolution Protocol (ARP) request message, to produce a hash value and a portion of the hash value operating as an index value for identifying the one of the plurality of virtual appliances.

15. An on-premises data center for handling traffic exchanged between a local network and a plurality of remote networks within a public cloud network, the on-premises data center comprising:
a default gateway configured to detect an incoming message, determine whether an entry within a prescribed table includes a Media Access Control (MAC) address for a targeted virtual machine associated with a selected service provided by the public cloud network, and either (i) generate a request message when the MAC address of the targeted virtual machine is not located within the prescribed table or (ii) forward the incoming message to the targeted virtual machine when the MAC address of the targeted virtual machine is located within the prescribed table; and
a plurality of virtual appliances communicatively coupled to the default gateway, wherein each of the plurality of virtual appliances including logic that is configured to select one of the plurality of virtual appliances to forward the request message to the plurality of remote networks deployed within the public cloud network and receive a response message to the request message, wherein the one of the plurality of virtual appliances being a first virtual appliance.

16. The on-premises data center of claim 15, wherein the request message is an Address Resolution Protocol (ARP) request message, the response message is an ARP response message and the prescribed table is a forwarding table.

17. The on-premises data center of claim 16, wherein the default gateway being configured to segment a subnet address range assigned to the local network to each of the plurality of remote networks communicatively coupled to the local network.

18. The on-premises data center of claim 16, wherein the logic within the plurality of virtual appliances to select the first virtual appliance for forwarding of the ARP request message to the plurality of remote networks includes performing an operation on an address within the ARP request message to produce a result for use in selecting the first virtual appliance of the plurality of virtual appliances.

19. The on-premises data center of claim 18, wherein the operation performed on the address within the ARP request message includes either a modulo operation or a hash operation.

20. The on-premises data center of claim 18, wherein each of the plurality of virtual appliances being further configured to establish a plurality of tunnels each corresponding to a gateway of a plurality of gateways that correspond to the plurality of remote networks.

21. The on-premises data center of claim 20, wherein the default gateway, based on receipt of the response message by the first virtual appliance, being further configured to forward the message including an Internet Protocol (IP) packet to the targeted virtual machine using the first virtual appliance based on an address provided in the response message.

22. The on-premises data center of claim 20, wherein the address included in the ARP response message comprises a MAC address belonging to the virtual machine.

23. The on-premises data center of claim 15, wherein the default gateway, based on receipt of the response message by the first virtual appliance, being further configured to forward the message including an Internet Protocol (IP) packet to the targeted virtual machine based on an address provided in the response message, the address including a MAC address belonging to the virtual machine or a MAC address belonging to a gateway associated with the targeted virtual machine.

24. A method for facilitating communications between client devices in geographically separated networks, comprising:
responsive to detecting a message and failing to locate a particular Open Systems Interconnection (OSI) Layer 2 address of a destination for the message based on prior messages from a client device,
selecting a first virtual appliance of the one or more virtual appliances for handling a forwarding of an Address Resolution Protocol (ARP) request message to a plurality of remote networks, and
forwarding the ARP message via the selected virtual appliance to a plurality of gateways associated with a plurality of remote networks to recover the OSI Layer 2 address of the destination corresponding to a virtual machine within a cloud network; and responsive to locating the particular OSI Layer 2 address associated with the destination of the message, selecting the virtual appliance previously handling communications with the destination to forward the message to the destination.

25. A method for facilitating communications between client devices in geographically separated networks, comprising:

detecting a message of a first message type by a routing device operating as a default gateway within a local network, the local network including a plurality of virtual appliances;

upon failing to locate a Media Access Control (MAC) address of a destination for the message within a table by the default gateway, selecting a virtual appliance of the plurality of virtual appliances for handling a forwarding of a request message to one or more remote networks, and forwarding the request message via the selected virtual appliance to one or more gateways associated with the one or more remote networks to receive the MAC address of the destination; and upon locating the MAC address of the destination within the table, a virtual appliance of the plurality of virtual appliances previously handling communications with the destination is selected to forward the message to the destination.

26. The method of claim 25, wherein the message of the first message type is an Address Resolution Protocol (ARP) request message.

27. The method of claim 26, wherein the selecting of the virtual appliance of the plurality of virtual appliances for handling the forwarding of the request message to the plurality of remote networks includes performing a modulo operation on an address within the ARP request message to produce a result operating as an index value for identifying the selected virtual appliance of the plurality of virtual appliances.

28. The method of claim 26, wherein the destination corresponds to a virtual machine within a private cloud network.

29. The method of claim 28 further comprising:

receiving an ARP response message by the selected virtual appliance from a first gateway of the one or more gateways, wherein the first gateway is associated with the virtual machine; and forwarding the message including an Internet Protocol (IP) packet to the destination using the selected virtual appliance based on the MAC address provided in the ARP response message.

30. The method of claim 25, wherein the selecting of the virtual appliance comprises performing a hash operation on an address within the request message, being an Address Resolution Protocol (ARP) request message, to produce a hash value and a portion of the hash value operating as an index value for identifying the selected virtual appliance of the plurality of virtual appliances.

* * * * *